United States Patent
Fan et al.

(10) Patent No.: US 11,522,593 B1
(45) Date of Patent: Dec. 6, 2022

(54) METHOD AND APPARATUS FOR SELECTING BEAMFORMING TECHNIQUE IN MULTI-CELL NETWORKS

(71) Applicant: HON LIN TECHNOLOGY CO., LTD., Taipei (TW)

(72) Inventors: Chia-Jung Fan, Hsinchu (TW); Chien-Jen Hwang, Hsinchu (TW); Ching-Ju Lin, Hsinchu (TW); Ping-Jung Hsieh, Hsinchu (TW); Tsung-Yen Chan, Hsinchu (TW)

(73) Assignee: HON LIN TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 17/581,841

(22) Filed: Jan. 21, 2022

(51) Int. Cl.
| | |
|---|---|
| *H04B 7/06* | (2006.01) |
| *G06N 20/00* | (2019.01) |
| *H04W 24/02* | (2009.01) |
| *H04B 7/0426* | (2017.01) |

(52) U.S. Cl.
CPC ........... *H04B 7/0617* (2013.01); *G06N 20/00* (2019.01); *H04B 7/043* (2013.01); *H04W 24/02* (2013.01)

(58) Field of Classification Search
CPC ...... H04B 7/0617; H04B 7/043; G06N 20/00; H04W 24/02
See application file for complete search history.

(56) References Cited

U.S. PATENT DOCUMENTS

| | | | |
|---|---|---|---|
| 9,326,209 B2 * | 4/2016 | Huang | H04W 36/22 |
| 2005/0037799 A1 | 2/2005 | Braun | |
| 2012/0052828 A1 | 3/2012 | Kamel | |
| 2013/0095774 A1 | 4/2013 | Gulati | |
| 2014/0018004 A1 | 1/2014 | Li et al. | |
| 2017/0078004 A1 | 3/2017 | Capar | |
| 2017/0272130 A1 | 9/2017 | Wang | |
| 2018/0020470 A1 * | 1/2018 | Zhuang | H04W 72/0426 |
| 2019/0097712 A1 | 3/2019 | Singh | |
| 2020/0288454 A1 | 9/2020 | Kim | |
| 2022/0129695 A1 * | 4/2022 | Mguni | G06K 9/6262 |

OTHER PUBLICATIONS

Abdullah et al., "Multi-Agent Reinforcement Learning and Self-Organization in a Network of Agents", May 18, 2007, AAMAS, pp. 1-8.*

* cited by examiner

*Primary Examiner* — Vineeta S Panwalkar
(74) *Attorney, Agent, or Firm* — ScienBiziP, P.C.

(57) ABSTRACT

A method for selecting a beamforming technique, applied in an apparatus of a multi-cell network, provides optimization to maximize effective throughput of communication based on the multi-cell network, the optimization is modelled as a Markovian decision process, and a multi-agent reinforcement learning framework is built based on the multi-cell network. A multi-agent reinforcement learning algorithm is used to generate the optimization and obtain a current beamforming selection strategy of all base stations.

10 Claims, 3 Drawing Sheets

METHOD AND APPARATUS FOR SELECTING BEAMFORMING TECHNIQUE IN MULTI-CELL NETWORKS

FIELD

The subject matter herein generally relates to wireless communications, and more particularly, to a method and an apparatus for beamforming selection in multi-cell networks.

BACKGROUND

In multi-cell networks, users at the cell edge are susceptible to interference from neighboring signals, so beamforming techniques can be used to increase the signal-to-noise ratio (SNR) of user equipment at the cell edge.

The selection of beamforming technique used for downlink transmission directly affects the communication quality between a base station and user equipment. Conventional beamforming techniques use base station scanning to determine an optimal beam vector, which takes a lot of time and requires more extensive information through communication. Therefore, signal overload and computational complexity will increase with the number of base stations. Quickly providing users with an accurate and suitable beamforming technique is problematic.

BRIEF DESCRIPTION OF THE DRAWINGS

Implementations of the present technology will now be described, by way of embodiment, with reference to the attached figures, wherein.

DETAILED DESCRIPTION

Figure 1:
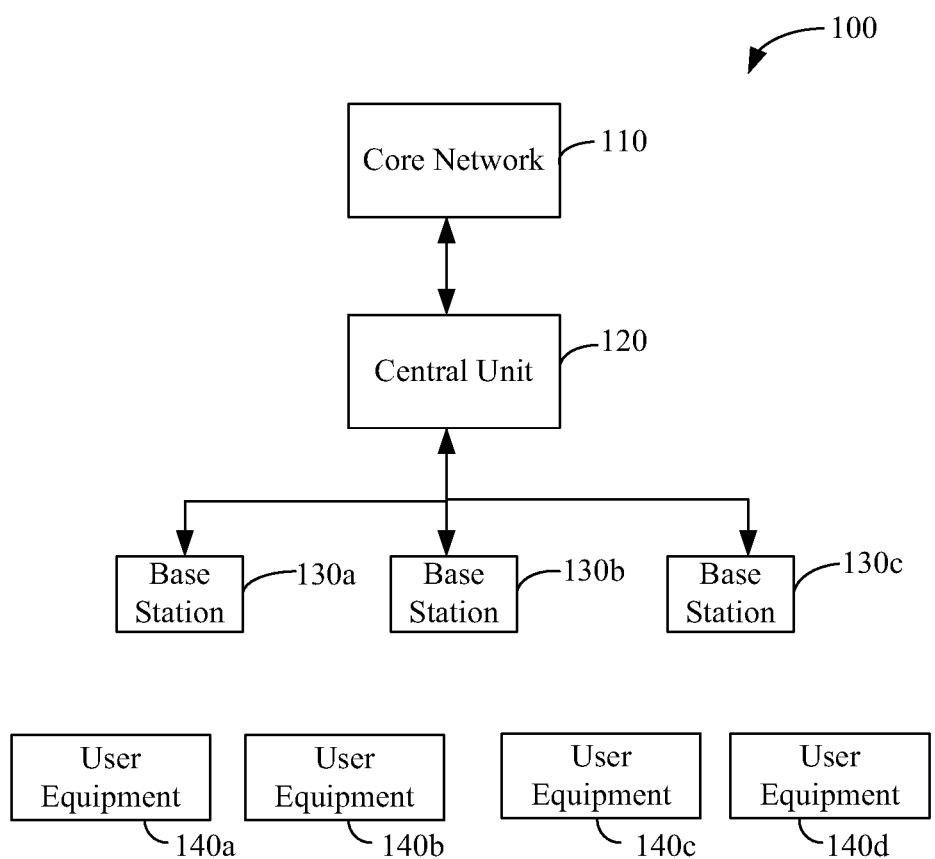
FIG. 1 is a schematic architecture diagram of one embodiment of a multi-cell network.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 is a schematic block diagram of a multi-cell network 100. The multi-cell network 100 comprises a core network 110, a central unit 120, a plurality of base stations (BSs), such as a BS 130a, a BS 130b, and a BS 130c, and a plurality of user equipments (UEs), such as a UE 140a, a UE 140b, a UE 140c, and a UE 140d. Each of BSs 130a-130c communicates with the central unit 120 and is connected to the core network 110 by the central unit 120.

In one embodiment, the central unit 120 comprises an access gateway device, a Radio Network Controller (RNC), a Mobility Management Entity (MME), and the like.

In one embodiment, each BS comprises a hybrid beamforming architecture that supports B beams and S radio frequency (RF) chains, where each RF chain is coupled to a phased array, also known as a phased antenna array or antenna array. $B=\{b_1, b_2, \Lambda, b_8\}$ represents a selected set of beam patterns, each of which can be steered in the direction of a predetermined B. That is, S phase arrays can manipulate S beams simultaneously to serve a maximum number of UEs in the same resource block (RB).

Figure 2:
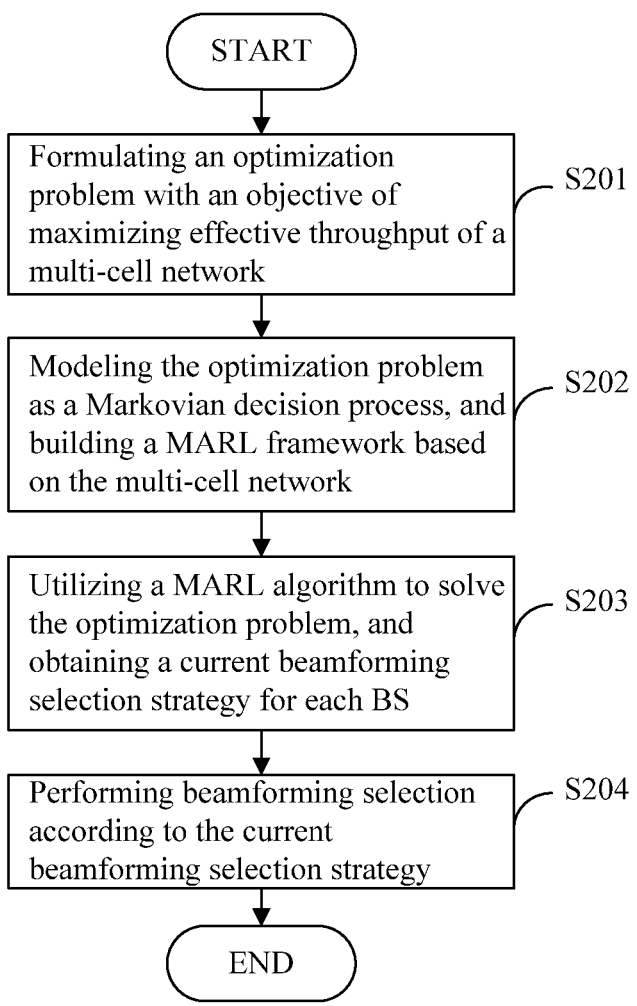
FIG. 2 is a flow chart of one embodiment of a method for selecting a beamforming technique in the multi-cell network.

FIG. 2 is a flow chart of a method for selecting a beamforming technique for a multi-cell network.

At step S201, formulating an optimization problem with an objective of maximizing effective throughput of a multi-cell network.

Specifically, the multi-cell network comprises a central unit, N BSs, and M UEs, each BS comprises S RF chains, and each RF chain comprises one or more antenna elements, where N is the number of BSs, M is the number of UEs, S is the number of RF chains.

At step S202, modeling the optimization problem as a Markovian decision process, and building a multi-agent reinforcement learning (MARL) framework based on the multi-cell network.

Specifically, the multi-cell network is deployed as an environment, and each BS is deployed as an agent to build the MARL framework.

At step S203, utilizing a MARL algorithm to solve the optimization problem on the MARL framework, and obtaining a current beamforming selection strategy for each BS.

In one embodiment, optimization by utilizing the MARL algorithm comprises configuring an action space, a state space, a global reward function, and a reward function of each agent of the MARL framework.

In one embodiment, the action space of the MARL framework is configured as a joint action space consisting of action spaces of all agents.

Specifically, the action space of an agent i is denoted by $A_i$, and the joint action space $A=A_1 \times \Lambda \times A_N$.

In one embodiment, all the agents are considered as homogeneous multiple agents, and the homogeneous multiple agents have the same action space, i.e., $A_1 \sim A_N$ are the same, and $A_i$ is the combination of all possible beamforming selection strategies.

In one example, $|\theta|=8$ indicates that there are 8 available beams, and S=4 indicates that 4 beams could be selected from them, then the action space $A_i$ with $|\theta|=8$ and $S=4$ could be expressed as $A_i=\{a_1:\{\theta_1,\theta_2,\theta_3,\theta_4\},a_2:\{\theta_1,\theta_2,\theta_3,\theta_5\},a_3:\{\theta_1,\theta_2,\theta_3,\theta_6\},a_4:\{\theta_1,\theta_2,\theta_3,\theta_7\},\Lambda\}$.

In one embodiment, a binary vector b represents the current action of each agent, i.e., the current beamforming selection strategy of each agent. For example, when $a_i(t)=4$, then $b_i(t)=[1,1,1,0,0,0,1,0]$.

In one embodiment, the MARL framework is built as a centralized training and decentralized execution framework. Since the decentralized execution is used, each agent makes decisions independently, so that the action space does not become larger and computation does not increase in complexity as the number of agents increases.

In one embodiment, the composition of the state space of the MARL framework is configured in same way as the composition of the state space of each agent.

In one embodiment, the state space $s_i$ of the agent i at a time t is represented as $s_i(t)$, and the $s_i(t)$ comprises the action of the agent i at a previous time (t−1), the load of the current beamforming selection, and the current downlink traffic demand of all UEs. In particular, the agent, i.e., the BS, can determine the current downlink traffic demand of all UEs by monitoring the number of packets queued in a packet buffer. Since data needed by each agent is available locally and does not require information exchange between agents, the state space of the MARL framework does not become larger and the computation does not become more complex as the number of agents grows.

In one embodiment, the global reward function of the MARL framework is configured as the effective throughput of the multi-cell network. The effective throughput is calculated based on the beamforming selection of each BS and the RBs assigned to each UE.

In one embodiment, each agent feeds back the current action, i.e., the current beamforming selection to the central unit, and after the central unit gets the selections of all BSs, the central unit sorts all UEs according to their transmission rates from high to low to form a UE list, and allocates the RBs of each selected beam of each BS to the UEs based in order according to the UE list. In other words, the central unit allocates the RBs of all the selected beams of the BSs in order of transmission rate of the UEs. After allocating the RBs to the UEs, the central unit calculates the effective throughput of the multi-cell network, i.e., a global reward function value, based on the beamforms selected by each BS and the RBs allocated to each UE.

In one embodiment, the central unit configures a reward function value of each agent as a contribution of the agent to the global reward function value, and feeds back the reward function value to the agents. That is, the reward function value of each agent is the effective throughput contributed by the agent.

If the central unit configures the reward function value of each agent as the global reward function value, each agent does not know how much it contributes to the global reward function value. For example, one agent may have chosen an optimal action for itself, but because other agents have chosen poorly, it gets a bad global reward function value, causing it to adjust its action in a wrong direction. Therefore, in the embodiment, the reward function value of each agent not only depends on its own action, but also depends on the joints actions of all agents. In this way, although each agent has its own reward function value, the agents still cooperate with each other when maximizing the reward function value. Because interference between cells is taken into account to maximize their own reward function value, selfishness among agents should not be a problem.

Since the reward function of each agent is required for a training phase, and the reward function value calculation of each agent also requires channel status information feedback from the UE, after the training phase is completed, the reward function value is not required for a decision making phase. Each agent takes the current action, i.e., the beamforming selection strategy, based on the local observation. Therefore, in the embodiment, the training phase is centralized in the central unit and the decision making phase is decentralized in each agent.

In one embodiment, the local observations of each agent comprise a downlink traffic demand and a report as to signal quality measured is fed back by the UEs.

In one embodiment, the downlink traffic demand is obtained based on the number of packets queued for transmission in the packet buffer.

In one embodiment, the report of measured signal quality comprises temporary or time average, variance, and standard deviation of a carrier to interference and noise ratio (CINR), a received signal strength indicator (RSSI), a received signal code power (RSCP), a reference signal received power (RSRP), and a reference signal received quality (RSRQ).

At step S204, each agent (BS) performs beamforming selection according to the current beamforming selection strategy.

Figure 3:
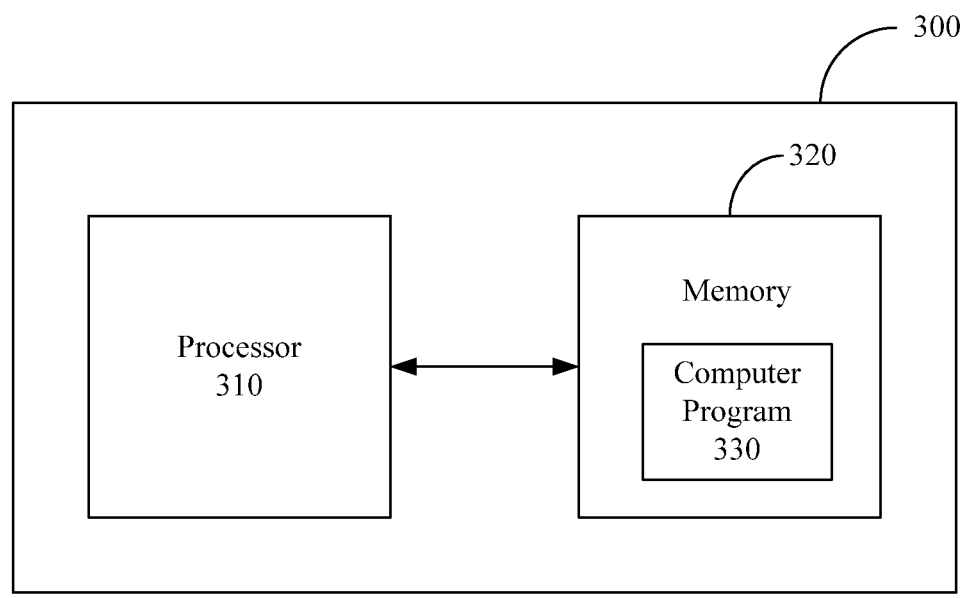
FIG. 3 is a schematic block diagram of one embodiment of an apparatus for selecting a beamforming technique in the multi-cell network.

FIG. 3 is a block diagram of an apparatus 300 for selecting a beamforming technique in the multi-cell network 100.

In one embodiment, the apparatus 300 comprises a server and the central unit 120 of FIG. 1. The apparatus 300 comprises a processor 310, a memory 320, and a computer program 330 stored in the memory 302 and executable on the processor 310. The processor 310 implements the steps in the implementation of the beamforming selection method in the multi-cell network 100, such as S201 to S204 shown in FIG. 2, when executing the computer program 330.

The computer program 330 may be divided into one or more modules, the one or more modules are stored in the memory 320 and executed by the processor 310. The one or more modules may be a series of instruction segments of a computer program capable of performing a particular function, which instruction segments are used to describe the execution of the computer program 330 in the apparatus 300.

It will be understood that FIG. 3 is merely an example of the apparatus 300 and does not constitute a limitation of the apparatus 300, other examples may comprise more or fewer components than illustrated, or a combination of certain components, or different components, e.g., the apparatus 300 may also comprise input and out modules, communication module, communication modules, a bus, etc.

In one embodiment, the processor 310 comprises a microcontroller, a microprocessor, a compact instruction set computing microprocessor, an extra-long instruction set computing microprocessor, an extra-long instruction set computing microprocessor, and a digital signal processor or other circuitry having computational processing capability.

In one embodiment, the memory 320 comprises computer-readable memory media that is read-only memory, random access memory, magnetic memory media, optical memory media, flash memory, electrical or other physical and tangible non-transitory storage devices.

In summary, the method and the apparatus for selecting a beamforming technique in the multi-cell network do not require multiple BSs to have full channel status information when performing beamforming selection, and real-time downlink traffic demand is taken into consideration during beamforming selection. A decentralized learning framework is adopted, which enables multiple BSs to perform joint beamforming selection in a decentralized manner and effectively increase network throughput in the long term.

The embodiments shown and described above are only examples. Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for selecting a beamforming technique applied to a multi-cell network that comprises a plurality of base stations (BSs), the method comprising:
   formulating an optimization problem with an objective of maximizing effective throughput of the multi-cell network;
   modeling the optimization problem as a Markovian decision process;
   building a multi-agent reinforcement learning (MARL) framework based on the multi-cell network;
   utilizing a MARL algorithm to solve the optimization problem according to the MARL framework;
   obtaining a current beamforming selection strategy for each of the plurality of BSs; and
   performing a beamforming selection, by each of the plurality of BSs, according to the current beamforming selection strategy.

2. The method of claim 1, wherein building a multi-agent reinforcement learning (MARL) framework based on the multi-cell network comprises:
   deploying the multi-cell network as an environment; and
   deploying each of the plurality of BSs as an agent.

3. The method of claim 1, wherein utilizing a MARL algorithm to solve the optimization problem according to the MARL framework comprises:
   configuring an action space, a state space, a global reward function, and a reward function for each of the plurality of BSs.

4. The method of claim 3, wherein the method further comprises:
   configuring the action space of the MARL framework as a joint action space comprising action spaces of the plurality of BSs.

5. The method of claim 3, wherein the method further comprises:
   configuring a composition of the state space of the MARL framework to be the same as a state space of each of the plurality of BSs.

6. The method of claim 5, wherein the method further comprises:
   configuring the state space of each of the plurality of BSs at a time t, the state space of each of the plurality of BSs at the time t comprises a beamforming selection of each of the plurality of BSs at a previous time (t−1), a load of a current beamforming selection, and a current downlink traffic demand.

7. The method of claim 3, wherein the method further comprises:
   configuring a value of the global reward function as the effective throughput of the multi-cell network.

8. The method of claim 7, wherein the method further comprises:
   configuring a value of the reward function of each of the plurality of BSs as effective throughput contributed by each of the plurality of BSs to the value of the global reward function.

9. The method of claim 4, wherein an action of each of the plurality of BSs comprises a combination of all possible beamforming selection strategies.

10. An apparatus for selecting a beamforming technique in a multi-cell network, the multi-cell network comprising a plurality of base stations (BSs), the apparatus comprising:
    a processor; and
    a memory storing at least one computer program, the at least one computer program comprising instructions that, when executed by the processor, cause the processor to:
    formulate an optimization problem with an objective of maximizing effective throughput of the multi-cell network;
    model the optimization problem as a Markovian decision process;
    build a multi-agent reinforcement learning (MARL) framework based on the multi-cell network;
    utilize a MARL algorithm to solve the optimization problem according to the MARL framework;
    obtain a current beamforming selection strategy for each of the plurality of BSs; and
    perform a beamforming selection, by each of the plurality of BSs, according to the current beamforming selection strategy.

* * * * *